E. TYDEN.
SEAL AND MOUNT.
APPLICATION FILED MAY 8, 1914.
1,128,803.
Patented Feb. 16, 1915.
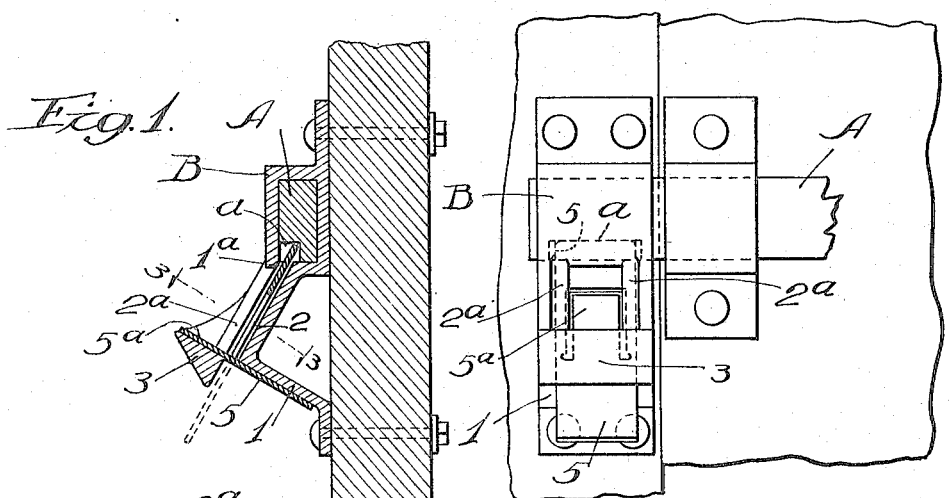
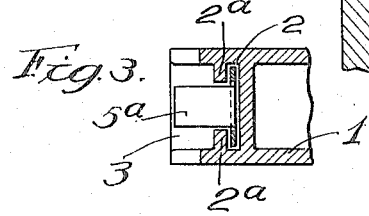
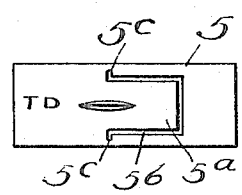
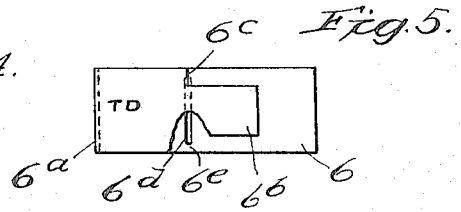
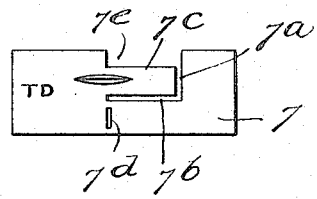
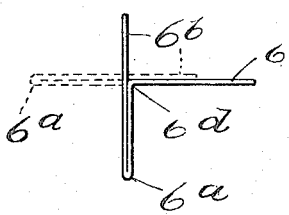
Witnesses:
C. F. Plumber
M. G. Ady
Inventor
Emil Tyden
by Burton & Burton
his Attys.

UNITED STATES PATENT OFFICE.

EMIL TYDEN, OF EVANSTON, ILLINOIS.

SEAL AND MOUNT.

1,128,803.   Specification of Letters Patent.   Patented Feb. 16, 1915.

Application filed May 8, 1914. Serial No. 837,254.

*To all whom it may concern:*

Be it known that I, EMIL TYDEN, a citizen of the United States, residing at Evanston, in the county of Cook and State of Illinois, have invented new and useful Improvements in Seals and Mounts, of which the following is a specification, reference being had to the accompanying drawings, forming a part thereof.

The purpose of this invention is to provide an improved construction of a sealing device, comprising a seal and its mount or support for locks or fastenings.

It consists in the elements and features of construction shown and described, as indicated in the claims.

In the drawings:—Figure 1 is a vertical section longitudinal with respect to the seal of a device embodying this invention, mounted for securing a slide bolt at locking position in its mounting. Fig. 2 is a front elevation of the same showing the seal inserted, but not secured. Fig. 3 is a section at the line, 3, 3, on Fig. 1. Fig. 4 is a plan view of the seal in the form presented before use for sealing. Fig. 5 is a modified form of a seal. Fig. 6 is a plan view of a further modified form of seal. Fig. 7 is an edge view of the form shown in Fig. 5 when folded into locking position in the mount.

The sealing device shown in the drawings comprises a mount, 1, which may be, as illustrated, part of the housing of a slide bolt or any member with respect to which another member is designed to be engaged for locking by the two members lapping on each other by any form of movement which may bring about such lapping relation. The mount has an aperture, $1^a$, through which the seal device which is of the nature of a subsidiary bolt, is thrust for engaging the part with respect to which the mount is to be secured by the seal. Leading to this aperture the mount has a slide-way, 2, along which the seal is thrust to enter the aperture, $1^a$. Said slide-way comprises lateral flanges or lips, $2^a$, $2^a$, overhanging the lateral margins of the seal, and prevents the latter from being bowed or bent up between its ends, or as might otherwise be done for withdrawing its inner end from the aperture, $1^a$, without withdrawing the seal bodily. At a distance back from the aperture, $1^a$, along the slide-way or path of inthrust of the seal, there is located an abutment, 3, which extends across the seal path above the same,—that is, so that the seal can be thrust in under the seal abutment along the slide-way, 2. The slide-way, or the web forming the bottom thereof, is terminated or cut away a little inward from the inner side of the transverse abutment, 3.

The seal may be made in either of the forms shown respectively in Figs. 4, 5 and 6. In the form shown in Fig. 4 the seal, 5, consists of a narrow metal strip having formed intermediate its ends a third terminal, $5^a$, which is produced so as to constitute a terminal by forming in the strip a slot, $5^b$, extending around three sides of a rectangular area, thus leaving standing within it and encompassed on three sides by it, the said terminal tongue or lug, $5^a$. In the form shown in Figs. 5 and 7 the seal is made of a metal strip, 6, folded upon itself at $6^a$, the portion thus folded back upon the body being less in length than the remainder of the body so that what constituted originally the end of the strip becomes positioned intermediate the ends of the device when thus folded. That is, the fold, $6^a$, constitutes one end of the completed seal and the end, $6^b$, of the strip becomes the third terminal located intermediate the ends of the completed seal. It will be observed that in the form shown in Fig. 4, the seal body is weakened at a transverse line across the root of the tongue or lug, $5^a$, such weakening being caused by the two lateral branches of the U-shaped slot which results in the formation of the intermediate terminal tongue or lug, $5^a$, and preferably the body is additionally weakened at said transverse line by slightly widening the U-shaped slot at the ends, as seen at $5^c$. In the form shown in Figs. 5 and 7 the portion which constitutes the intermediate terminal, $6^b$, is defined by that portion of the strip being narrowed by cutting away the metal at the sides for a distance which measures the length of the terminal forming the shoulders, $6^c$; and the body of the seal is weakened for breaking at a transverse line proximate to the root or base of the tongue, that is, the line of the shoulders, $6^c$, by a transverse slot, $6^d$, formed in the body, substantially at the transverse line at which the shoulders, $6^c$, are positioned when the seal is completed by folding at the line, $6^a$. It will be observed that the two forms of seal are substantially the same in their general characteristics, the only difference being that in one case the intermediate terminal is formed as a lug in the body of the original blank at a point intermediate the ends, while in the other form an end portion of the original strip is folded back upon the remainder to locate the intermediate terminal at the same position.

In the drawings the mount, 1, is shown as a part of the housing, B, for a slide bolt, A, and the slide bolt has a notch or aperture, $a$, which when the bolt is in locking position registers with the aperture, $1^a$, so that the end of the seal bolt thrust through the aperture, $1^a$, engages the aperture or notch, $a$, of the bolt. In using the device when the bolt has been thrust into locking position to register the apertures, $1^a$ and $a$, the seal is thrust under the abutment, 3, along the slide-way 2, through the aperture, $1^a$, into engagement with the bolt, the operator in so thrusting it having hold of its outer end. When the seal is fully thrust in, the operator will press down the outer end, bending the seal body about the outer end of the web or seal seat of the slide-way, the weakened line of the seal body being at said locking position substantially registered with the said outer end edge of the seal seat. In being thus bent down around the web or seal seat of the slide-way, 2, the outer end portion of the seal body will carry with it the intermediate terminal, the tongue, $5^a$, of the form shown in Fig. 4, or $6^a$, of the form shown in Fig. 5, which tongue will remain in the plane of the outer end portion of the seal which is thus being bent down so that said tongue when the bending is complete will stand up across and against the inner side of the abutment, 3, and will prevent the withdrawal of the seal which can thereafter be effected only by straightening out the seal so as to restore the tongue substantially to its original plane,—that is, the plane of the body portion which occupies the slide-way; and the character of the seal is such that in view of its weakening at the transverse line at which it is bent, it will not endure straightening, but will break in the attempt to straighten it; and this is the purpose of the construction so that any attempt at removing the seal by any one unauthorized to do so will be disclosed by the fact of the seal being broken. When such seals are used on packages, receptacles or cars in transportation, and of which inspection is required at prescribed points in the course of transportation, the discovery of any tampering with the seal between the points of inspection is insured by having the identifying mark which the inspector will be obliged to report impressed upon the portion of the seal which is broken away when the seal is thus tampered with, so that the inspector in such case being obliged to notice the lock for obtaining and reporting the identifying mark, cannot fail to note the absence of the part containing the mark.

It will be understood that the devices here shown apply to a bolt and its housing merely for the purpose of indicating its general character, and it will be obvious that its application is not limited to such situations, but that it is applicable to any locking device or closure in which two parts may be prevented from relative movement by the end of the seal bolt thrust through them both, when one of the parts may comprise or have secured upon it the mount for the seal.

In Fig. 6 there is shown a further modification of the form of the seal, consisting in the manner of producing the intermediate terminal which in this form is produced by making an angular slit, $7^a$, $7^b$, commencing at one lateral edge of the strip, 7, extending in to about the middle of the width and thence longitudinally toward the outer end for a distance equal to the desired length of the said intermediate terminal, $7^c$, which is thus produced. The seal body is weakened for transverse bending and breaking by an aperture, $7^d$, situated at a transverse line at the outer end of said slit, $7^b$, at the opposite side of said slit from that from which the transverse portion 6, of the slit extends. The seal in this form is to be used in precisely the same manner as in the other forms, the weakening aperture, $7^d$, being at the position for folding the seal down over the outer edge of the seal seat to tip the terminal, $7^c$, up against the abutment. In this form a marginal notch, $7^e$, is necessarily made at the side at which the terminal, $7^c$, is situated, the depth of said notch being the width of the overhanging retaining lip, $2^a$, of the mount, and said notch being necessary to permit the terminal, $7^c$, to swing up past said lip when the seal is bent.

I claim:—

1. In combination with a seal mount, comprising a seat for a seal along which it may be thrust for engagement with the parts to be secured, and an abutment past which the seal is thrust along its seat into locking position, a seal having in addition to its normal ends a third terminal intermediate its ends, the seal body being adapted to be folded at a line transverse to the direction of inthrust of the strip back of the end of said intermediate terminal to carry said intermediate terminal into a plane transverse to the inthrust and to the normal plane of the seal body, whereby when thus bent, said intermediate terminal projects past the abutment at the inner side thereof for stopping the seal against withdrawal, the seal body being so weakened at said line of bending as to insure its breaking when straightened back to restore the intermediate terminal to its original plane.

2. In combination with a seal mount having a seal path and an abutment extending across same, and a seal adapted to be thrust along the path having in addition to its normal ends a third terminal intermediate its ends, the seal body being adapted to be bent at a line transverse to the direction of inthrust of the strip back of the end of said terminal to carry the terminal to a position projecting across the abutment, said mount having the seal seat terminating in an edge about which the seal body may be bent, positioned inward from the inner side of the abutment enough to accommodate between the vertical planes of said inner edge and the inner side of the abutment the thickness of the seal, the seal body being weakened at said line of folding for breaking upon being folded back to original position.

3. In combination with a seal mount, a seal adapted to be thrust therealong into locking position, said mount comprising a slide-away along which the seal is thus thrust, having lateral lips or flanges overhanging the seal path for engaging the margins of the seal above said path, said mount comprising an abutment extending across the seal path above the same, and having the seal-supporting web terminating or cut away at a transverse line forming an edge about which the seal may be bent, located a little inward from the inner side of said transverse abutment, the seal being adapted to be bent at said line, and having a portion which is carried into position transverse to the abutment by bending the seal over said edge, the seal being weakened for breaking at said line of bending when straightened back to original form.

In testimony whereof, I have hereunto set my hand at Chicago, Illinois, this 6th day of May, 1914.

EMIL TYDEN.

Witnesses:
EDNA M. MACINTOSH,
M. GERTRUDE ADY.